(12) United States Patent
Adachi

(10) Patent No.: US 9,462,149 B2
(45) Date of Patent: Oct. 4, 2016

(54) CONTROLLING AN IMAGE FORMING APPARATUS ACCORDING TO PARAMETERS DETERMINED BASED ON PAPER TYPE HISTORY

(71) Applicant: FUJI XEROX CO., LTD., Tokyo (JP)

(72) Inventor: Koji Adachi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/467,733

(22) Filed: Aug. 25, 2014

(65) Prior Publication Data
US 2015/0222775 A1    Aug. 6, 2015

(30) Foreign Application Priority Data

Feb. 3, 2014    (JP) ................. 2014-018322

(51) Int. Cl.
*H04N 1/00* (2006.01)

(52) U.S. Cl.
CPC ...... *H04N 1/00954* (2013.01); *H04N 1/00039* (2013.01); *H04N 1/00068* (2013.01); *H04N 1/00082* (2013.01); *H04N 1/0097* (2013.01); *H04N 2201/0094* (2013.01)

(58) Field of Classification Search
CPC ........... H04N 1/00954; H04N 1/0097; H04N 1/00068; H04N 1/00039; H04N 1/00082
USPC ........................ 358/1.16, 1.6, 1.15
See application file for complete search history.

(56) References Cited

U.S. PATENT DOCUMENTS 8,654,370 B2 *   2/2014   Tsubouchi ................ 358/1.14
2012/0062928 A1   3/2012   Tsubouchi

FOREIGN PATENT DOCUMENTS

| JP | A-2010-173130 | 8/2010 |
| JP | A-2012-083707 | 4/2012 |
| JP | A-2012-147109 | 8/2012 |

* cited by examiner

Primary Examiner — Eric A Rust
(74) Attorney, Agent, or Firm — Oliff PLC

(57) ABSTRACT

Provided is a parameter setting system, including a storage unit that memorizes a history of parameter values in an image forming apparatus in association with a type of paper, an acquiring unit that acquires a trend of parameter values in plural image forming apparatuses of the same type with the image forming apparatus with respect to each type of plural other paper sheets in which the number of types of switched paper and the number of histories are greater than or equal to a threshold value, and a calculating unit that calculates a parameter value to be set with respect to the type of switched paper based on the trend of parameter values acquired with respect to the type of switched paper and each type of the plural other paper sheets, and the history corresponding to each type of the plural other paper sheets.

12 Claims, 10 Drawing Sheets

DISTRIBUTION OF SETTING VALUES A WITH RESPECT TO BASIS WEIGHT CLASSIFICATION 1

DISTRIBUTION OF SETTING VALUES
A WITH RESPECT TO BASIS WEIGHT
CLASSIFICATION 1

DISTRIBUTION OF SETTING VALUES
A WITH RESPECT TO BASIS WEIGHT
CLASSIFICATION 2

DISTRIBUTION OF SETTING VALUES
A WITH RESPECT TO BASIS WEIGHT
CLASSIFICATION 3

CHARACTERISTIC (CENTRAL VALUE) OF SETTING VALUES A OF MARKET MACHINE WITH RESPECT TO BASIS WEIGHT CLASSIFICATION

CHARACTERISTIC (CENTRAL VALUE) OF SETTING VALUES A OF PREDICTION TARGET MACHINE WITH RESPECT TO BASIS WEIGHT CLASSIFICATION AND ESTIMATED VALUE WITH RESPECT TO BASIS WEIGHT CLASSIFICATION 2

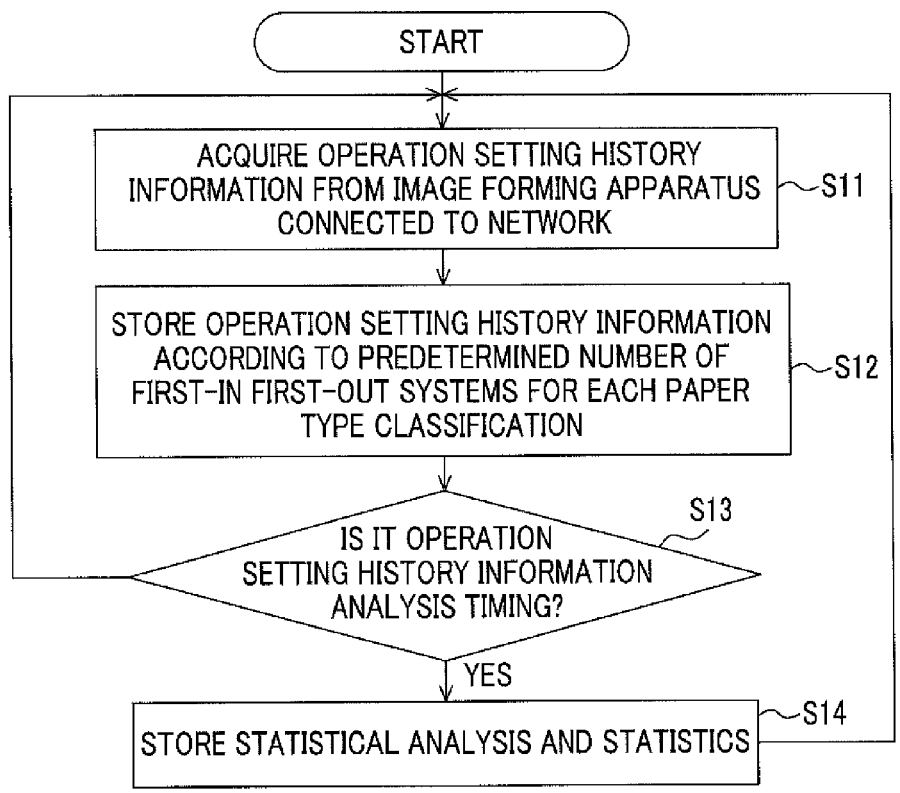
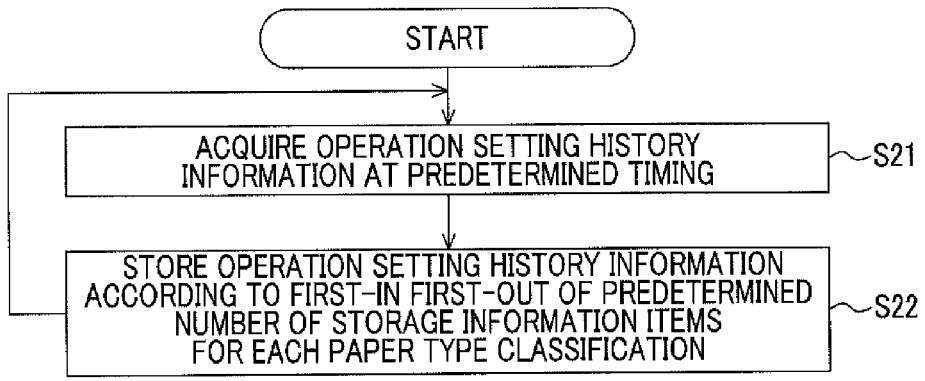

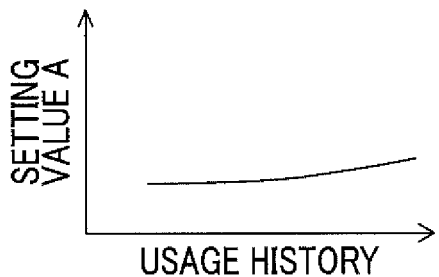
PREDICTION MODEL OF SETTING VALUES A WITH RESPECT TO BASIS WEIGHT CLASSIFICATION 1
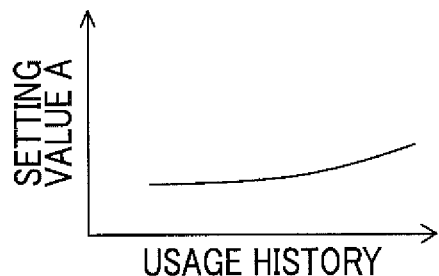
PREDICTION MODEL OF SETTING VALUES A WITH RESPECT TO BASIS WEIGHT CLASSIFICATION 2
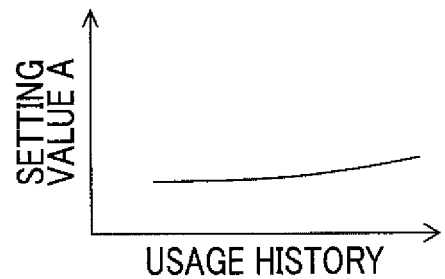
PREDICTION MODEL OF SETTING VALUES A WITH RESPECT TO BASIS WEIGHT CLASSIFICATION 3

CALCULATION OF SETTING VALUES A OF TARGET MACHINE
WITH RESPECT TO BASIS WEIGHT CLASSIFICATION 2

CORRECTION AMOUNT OF SETTING VALUES A OF TARGET
MACHINE ACCORDING TO PREDICTION MODEL WITH
RESPECT TO THE NUMBER OF OUTPUT SHEETS OF
BASIS WEIGHT CLASSIFICATION 2

CONTROLLING AN IMAGE FORMING APPARATUS ACCORDING TO PARAMETERS DETERMINED BASED ON PAPER TYPE HISTORY

CROSS-REFERENCE TO RELATED APPLICATIONS

This application is based on and claims priority under 35 USC 119 from Japanese Patent Application No. 2014-018322 filed Feb. 3, 2014.

BACKGROUND (i) Technical Field

The present invention relates to a parameter setting system and a parameter setting apparatus.

(ii) Related Art

As an image forming apparatus having a function of forming an image on a recording material such as paper, a copying machine, a printer apparatus, a facsimile apparatus, a multifunctional machine combined with the functions thereof, and the like are known.

In the image forming apparatus produced commercially, various paper sheets are used, and thus machinery operation parameters are automatically set based on a stock library in which an optimal value of the machinery operation parameter for each paper sheet is held. However, since there is a difference in the characteristics or the usage state (a usage history or a usage environment) of each machine (a machine to machine variation), the automatically set machinery operation parameter is not necessarily the optimal parameter. Accordingly, at the time of switching the paper, it is necessary for an operator or a maintenance-service person to print a test pattern and to manually set the machinery operation parameter while confirming the printing state.

Further, in the image forming apparatus produced commercially, a large volume of printing is performed, and thus the same machinery operation parameter is not able to be continuously used due to a change (degradation) of a state of an associated member, and the machinery operation parameter is required to be suitably adjusted.

Up to the present, regarding to the setting of the machinery operation parameter of the image forming apparatus, various technologies have been proposed.

SUMMARY

According to an aspect of the invention, there is provided a parameter setting system, including:

a storage unit that memorizes a history of parameter values in an image forming apparatus in association with a type of paper with respect to the image forming apparatus which sets the parameter value for controlling an image forming operation according to the type of paper;

an acquiring unit that acquires a trend of parameter values in plural image forming apparatuses of the same type with the image forming apparatus with respect to each type of plural other paper sheets in which the number of types of switched paper and the number of histories are greater than or equal to a threshold value when the number of histories corresponding to the type of switched paper upon switching the type of paper to be used in the image forming apparatus is smaller than the threshold value; and a calculating unit that calculates a parameter value to be set with respect to the type of switched paper based on the trend of parameter values acquired with respect to the type of switched paper and each type of the plural other paper sheets, and the history corresponding to each type of the plural other paper sheets.

BRIEF DESCRIPTION OF THE DRAWINGS

Exemplary embodiments of the present invention will be described in detail based on the following figures, wherein:

FIG. 3 is a diagram illustrating an example of a processing flow according to a collection and an analysis of the operation setting history information by a management server in FIG. 1;

FIG. 4 is a diagram illustrating an example of a processing flow according to the collection of the operation setting history information by each image forming apparatus in FIG. 1;

FIGS. 7A to 7E are diagrams for explaining a calculation of a correction amount of a setting value of each machinery operation parameter according to a change of a usage state of an image forming apparatus in FIG. 6;

DETAILED DESCRIPTION

An exemplary embodiment of the invention will be described with reference to the drawings.

Figure 1:
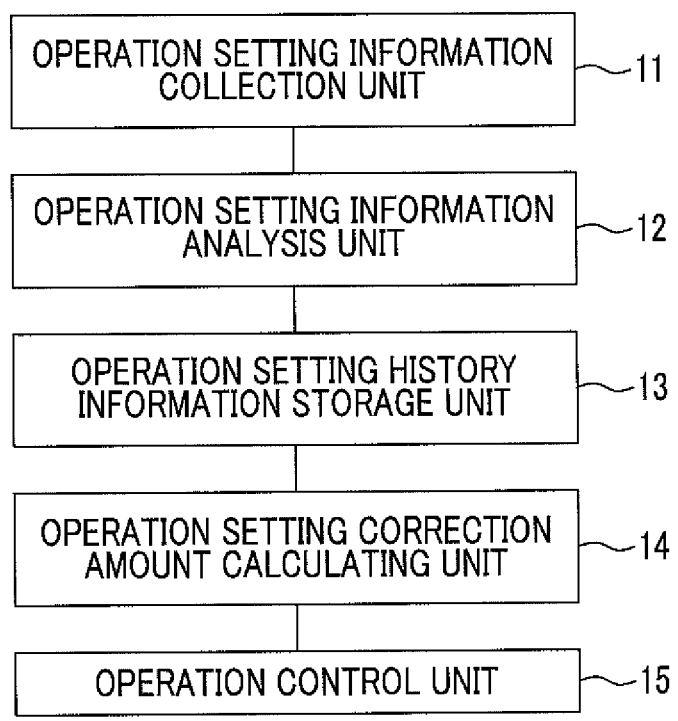
FIG. 1 is a diagram illustrating a configuration example of a parameter adjusting system according to an exemplary embodiment of the invention.

In FIG. 1, a configuration example of a parameter adjusting system according to an exemplary embodiment of the invention is illustrated.

The parameter adjusting system of this example, obtains a distribution of a setting value of each machinery operation parameter for each type of paper (hereinafter, referred to as a "paper type") based on a past history of the setting value of each of the machinery operation parameters in plural image forming apparatuses, and calculates the setting value of each of the machinery operation parameters for a switched paper type from a relationship between the past history of the apparatus according to the switched paper type and the obtained distribution at the time of switching the paper type used in the image forming apparatus.

As illustrated in FIG. 1, the parameter adjusting system of this example includes an operation setting information collection unit 11, an operation setting information analysis unit 12, an operation setting history information storage unit 13, an operation setting correction amount calculating unit 14, and an operation control unit 15.

The parameter adjusting system operates, for example, in cooperation with a so-called remote management system including a management server which is connected to a network to be communicable with the plural image forming apparatuses. In this example, the management server includes the operation setting information collection unit 11, and the operation setting information analysis unit 12, and each of the image forming apparatuses includes the operation setting history information storage unit 13, the operation setting correction amount calculating unit 14, and the operation control unit 15, but the configuration is not limited thereto.

The operation setting information collection unit 11 collects operation setting history information in which the setting value of each changed machinery operation parameter is recorded at the timing that the setting value of the machinery operation parameter required to be adjusted for each paper type is changed according to the switching of the paper type from the plural image forming apparatuses connected to the management server through the network, and accumulates the operation setting history information and paper type information for identifying the switched paper type for each type of image forming apparatus and each paper type classification.

That is, in each of the image forming apparatuses, the setting value of each of the machinery operation parameters which is manually or automatically changed with respect to the switched paper type is accumulated as the past history.

Here, the machinery operation parameters are parameters for controlling an image forming operation, in general, parameters (a secondary transfer voltage correction amount, a fixing temperature correction amount, a decurler intensity, or the like) related to the image forming after a transfer process become a target, and a value in which paper characteristic information corresponding to the paper type to be used is considered is set. In addition, parameters (a potential of a photoreceptor, a light amount of a semiconductor laser, or the like) related to the image forming before the transfer process may be set according to the gloss level of the paper to be used.

The paper characteristic information corresponding to the paper type is information of various characteristic values indicating a characteristic of the paper type, and for example, information of a characteristic value such as a paper size, a paper type, a surface property (a presence or absence of coating, or the like), a basis weight ($g/m^2$) and a paper color is included.

The paper type classification is a unit for classifying the paper type based on the paper characteristic information, and for example, a 4×3 matrix shaped paper type classification in which the basis weight is divided into four steps according to magnitude of the value, and the surface property is divided into three steps according to magnitude of the value, is used.

The operation setting information analysis unit 12 analyzes the operation history setting information (the setting value of each of the machinery operation parameters) which is collected and accumulated by the operation setting information collection unit 11, calculates distribution information indicating a trend of setting values with respect to each of the machinery operation parameters, and stores the calculation result for each type of image forming apparatus and each of the paper type classifications.

As the distribution information of the setting values of the machinery operation parameters, for example, statistics such as a central value or a standard deviation of the setting values is calculated.

The analysis of the setting value of the machinery operation parameter is implemented at a predetermined timing, and for example, is implemented at the same timing every day.

In the parameter adjusting system of this example, the above processes (processes according to the operation setting information collection unit 11, and the operation setting information analysis unit 12) are implemented on the management server side, and the following processes (processes according to the operation setting history information storage unit 13, the operation setting correction amount calculating unit 14, and the operation control unit 15) are implemented by each of the image forming apparatuses.

The operation setting history information storage unit 13 collects the operation setting history information in which the setting value of each of the machinery operation parameters of the own apparatus is recorded at the timing that the setting value of the machinery operation parameter required to be adjusted for each paper type is changed according to the switching of the paper type, and accumulates the operation setting history information for each of the paper type classifications identical to that of the management server side.

That is, in the own apparatus, the setting value of each of the machinery operation parameters which is manually or automatically changed with respect to the switched paper type is accumulated as the past history.

The operation setting correction amount calculating unit 14 acquires the paper characteristic information corresponding to the switched paper type from a paper database in which the paper type information and the paper characteristic information are associated with each other at the timing of switching the paper type to be used. In addition, when there is no paper characteristic information corresponding to the switched paper type in the paper database, an operator manipulates a manipulation panel of the image forming apparatus and inputs the paper characteristic information.

Next, the paper type classification to which the paper characteristic information acquired from the paper database (or input by the operator) belongs is specified, and the operation setting history information corresponding to the paper type classification is acquired from the operation setting history information storage unit 13 as a sample.

Then, when the number of samples of the operation setting history information acquired from the operation setting history information storage unit 13 is greater than or equal to a predetermined threshold value, that is, when the number of samples of the operation setting history information is sufficient, an average of the setting values of the machinery operation parameters in the operation setting history information is calculated, and the calculated average value is set as the setting value of the machinery operation parameter after switching the paper type.

On the other hand, when the number of samples of the operation setting history information acquired from the operation setting history information storage unit 13 is smaller than the threshold value, that is, when the number of samples of the operation setting history information is insufficient, the operation setting history information is acquired from the operation setting history information storage unit 13 with respect to other plural paper type classifications in which the operation setting history information having a value greater than or equal to the threshold value exists. In addition, with respect to the specified paper type classification and each of the other plural paper type classifications, the distribution information of the setting values of each of the machinery operation parameters in the plural image forming apparatuses of the same type with the own apparatus is requested to the operation setting information analysis unit 12 of the management server, and the corresponding distribution information is received.

Here, in this example, as the other plural paper type classifications in which the operation setting history information having a value greater than or equal to the threshold value exists, each of paper type classification in the vicinity of the specified paper type classification, specifically, before and after the specified paper type classification is preferentially selected, and the distribution information of the setting values of each of the machinery operation parameters is acquired. That is, the paper type classification having a paper characteristic of a value close to the paper characteristic of the specified paper type classification is preferentially selected, and the distribution information of the setting value of each of the machinery operation parameters in the corresponding paper type classification is acquired.

Then, the setting value of the machinery operation parameter after switching the paper type is calculated based on the distribution information of the setting value of each of the machinery operation parameters received from the operation setting information analysis unit 12 with respect to the specified paper type classification and the other plural paper type classifications, and the operation setting history information acquired from the operation setting history information storage unit 13 with respect to the other plural paper type classifications.

The calculation of the setting value of the machinery operation parameter after switching the paper type at the time that the number of samples of the operation setting history information is insufficient will be specifically described with reference to FIGS. 2A to 2E.

Here, for the sake of simplicity of the description, the paper type classification in which the basis weight which is a type of paper characteristic is divided into the three steps according to the magnitude of the value is used, and a basis weight classification 1, a basis weight classification 2, and a basis weight classification 3 are set in increasing order of the value of the basis weight. In addition, the switched paper type belongs to the basis weight classification 2, the number of samples of the operation setting history information corresponding to the basis weight classification 2 is insufficient, and the number of samples of the operation setting history information corresponding to the basis weight classifications 1 and 3 which are in the vicinity of the basis weight classification 2 is sufficient.

With respect to the basis weight classification 2 to which the switched paper type belongs and the basis weight classifications 1 and 3 which are in the vicinity of the basis weight classification 2, the operation setting correction amount calculating unit 14, first, requests the distribution information (the central value or the standard deviation) of the setting value of each of the machinery operation parameters in the plural image forming apparatuses of the same type with the own apparatus to the operation setting information analysis unit 12 of the management server, and receives the corresponding distribution information.

Figure 2A:
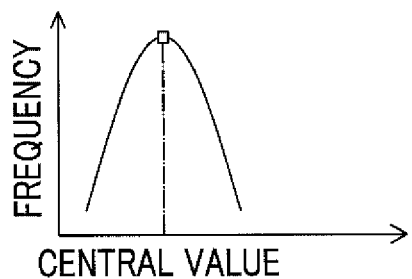
FIGS. 2A to 2E are diagrams for explaining a calculation of a setting value of machinery operation parameters after switching paper type when the number of samples of operation setting history information is insufficient in FIG. 1.
Figure 2B:
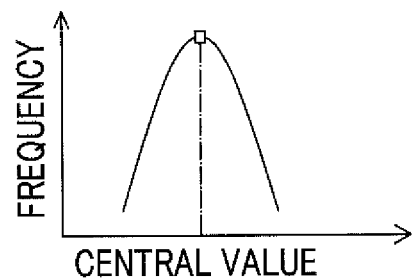
Figure 2C:
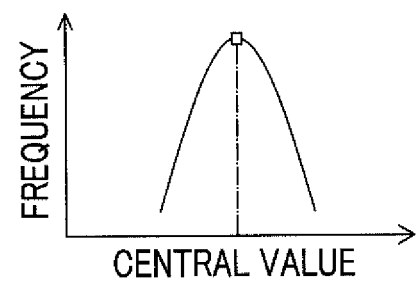

In FIGS. 2A to 2C, with respect to each of the basis weight classifications 1 to 3, graphs of the distribution of the setting values of machinery operation parameters A at the time of using a paper type belonging to the respective paper type classification are illustrated. In the graphs, a horizontal axis indicates the setting value, a vertical axis indicates an appearance frequency of each setting value, and a mark "□" indicates the central value of the setting values.

Comparing each of the graphs of FIGS. 2A to 2C, it is understood that the central value indicated by the mark "□" moves in a direction of increase on the graph as the value of the basis weight, the basis weight classification 1, the basis weight classification 2, and the basis weight classification 3 increases. The same is able to be grasped from the graph in FIG. 2D. Furthermore, in FIG. 2D, the basis weight classifications 1 to 3 are arranged on the horizontal axis in increasing order of the value of the basis weight, and each central value of the basis weight classifications 1 to 3 is indicated on the vertical axis.

Next, the operation setting correction amount calculating unit 14 calculates an interpolation curve with respect to the central value of the setting values of the machinery operation parameters A in the basis weight classifications 1 to 3 based on the distribution information received from the operation setting information analysis unit 12 of the management server.

Figure 2D:
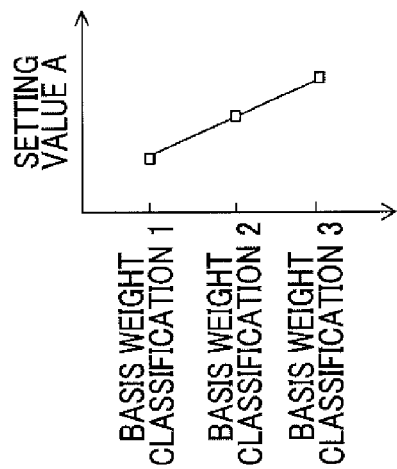

In FIG. 2D, the interpolation curve calculated with respect to the central value of the setting values of the machinery operation parameters A in the basis weight classifications 1 to 3 is indicated by a solid line. The interpolation curve illustrates the transition of the setting value of the machinery operation parameter A according to the change of the basis weight, and indicates an overall trend of plural image forming apparatuses in the system.

Calculation of the interpolation curve is able to be performed, for example, by using a polynomial approximation curve according to a least square method. In this example, the interpolation is performed on three points of the basis weight classifications 1 to 3, and thus a quadratic curve is formed. Furthermore, when a paper type classification including other paper characteristics such as the paper type is used, for example, the interpolation may be performed by using a polynomial approximation curved surface according to the least square method.

Next, with respect to each of the basis weight classifications 1 and 3 (the vicinity of the basis weight classification 2 to which the switched paper type belongs), the operation setting correction amount calculating unit 14 calculates the average of the setting values of the machinery operation parameters A in the operation setting history information of the own apparatus, and calculates (estimates) the setting value of the machinery operation parameter A of the basis weight classification 2 in the own apparatus from a relationship of the difference between the calculated average value and the interpolation curve. As the transition of the setting value of the machinery operation parameter A according to the change of the basis weight, the same trend (the same interpolation curve) is used in the same type of plural image forming apparatuses.

Figure 2E:
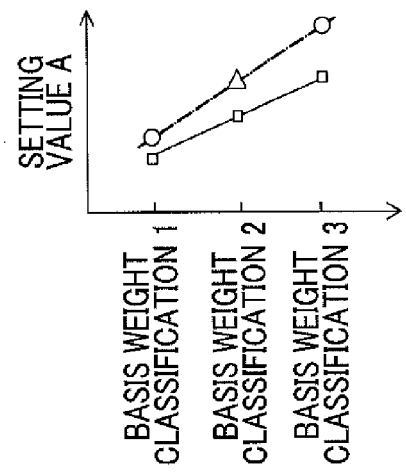

That is, as illustrated in FIG. 2E, the interpolation curve (indicated by the solid line) which is calculated with respect to the plural image forming apparatuses of the same type with the own apparatus is converted into an interpolation curve (indicated by a dashed and dotted line) adapted to the own apparatus based on the average value (indicated by a mark "o") of the setting values of the machinery operation parameters A of the basis weight classifications 1 and 3 in the own apparatus, and the setting values of the machinery operation parameters A of the basis weight classification 2 in the converted interpolation curve is specified, and thus the setting value (indicated by a mark "Δ") of the machinery operation parameter A of the basis weight classification 2 in the own apparatus is calculated (estimated).

Thus, the interpolation curve calculated with respect to the plural image forming apparatuses of the same type with the own apparatus is converted according to the setting value with respect to the paper type classification in the vicinity of the paper type classification after switching the paper type in the own apparatus, and the interpolation is performed based on the interpolation curve adapted to the own apparatus obtained therefor, and thus it is possible to calculate the setting value with respect to the paper type classification after switching the paper type in the own apparatus.

Furthermore, the setting value of each of the machinery operation parameters is different according to a characteristic (a machine to machine variation) intrinsic to the image forming apparatus or an amount of degradation.

Here, when the standard deviation of the setting values of the machinery operation parameters A of the basis weight classifications 1 and 3 in the own apparatus has a difference exceeding a predetermined threshold value with respect to the standard deviation of the setting value of each of the machinery operation parameters of the basis weight classifications 1 and 3 received from the operation setting information analysis unit 12 of the management server, trouble is likely to occur at the time of performing an image forming process by directly applying the setting value of the machinery operation parameter A of the basis weight classification 2 calculated according to the above method, and thus an alert may be notified to the operator of the image forming apparatus.

The operation control unit 15 controls the subsequent (after switching the paper type) image forming process by applying the setting value of each of the machinery operation parameters calculated by the operation setting correction amount calculating unit 14.

Furthermore, a function unit in which the setting value of each of the machinery operation parameters calculated by the operation setting correction amount calculating unit 14 is displayed as a recommendation value may be disposed instead of the operation control unit 15, and the operator of the image forming apparatus may manually perform setting of each of the machinery operation parameters according to the displayed setting value.

A flow of a process according to the parameter adjusting system of this example will be described with reference to an example of a processing flow illustrated in FIG. 3 to FIG. 5.

In FIG. 3, an example of a processing flow according to a collection and an analysis of the operation setting information (the setting value of each of the machinery operation parameters) by a management server is illustrated.

The management server collects the operation setting history information from the plural image forming apparatuses connected to the network by the operation setting information collection unit 11 (Step S11), and stores the operation setting history information according to a first-in first-out system of the predetermined number of data items for each type of image forming apparatus and each paper type classification (Step S12).

In addition, the management server determines whether or not it is an analysis timing of the operation setting history information (Step S13), and when the management server determines that it is not the analysis timing, the process returns to Step S11, and the collection and the storage of the operation setting information from each of the image forming apparatuses are repeated until the management server determines that it is the analysis timing.

In Step S13, when the management server determines that it is the analysis timing, the operation setting information analysis unit 12 performs a statistical analysis with respect to the operation setting information collected by the operation setting information collection unit 11, and stores the statistics (the central value or the standard deviation of the setting values of each of the machinery operation parameters) of the analysis result as the distribution information (Step S14).

In FIG. 4, an example of a processing flow according to the collection of the operation setting history information (the setting value of each of the machinery operation parameters) by each of the image forming apparatuses is illustrated.

Each of the image forming apparatuses collects the operation setting history information by the operation setting history information storage unit 13 (Step S21), and stores the operation setting history information according to the first-in first-out system of the predetermined number of data items for each paper type classification (Step S22).

The collection or the storage of the operation setting history information by the operation setting history information storage unit 13 is repeated for each switching of the paper type.

Figure 5:
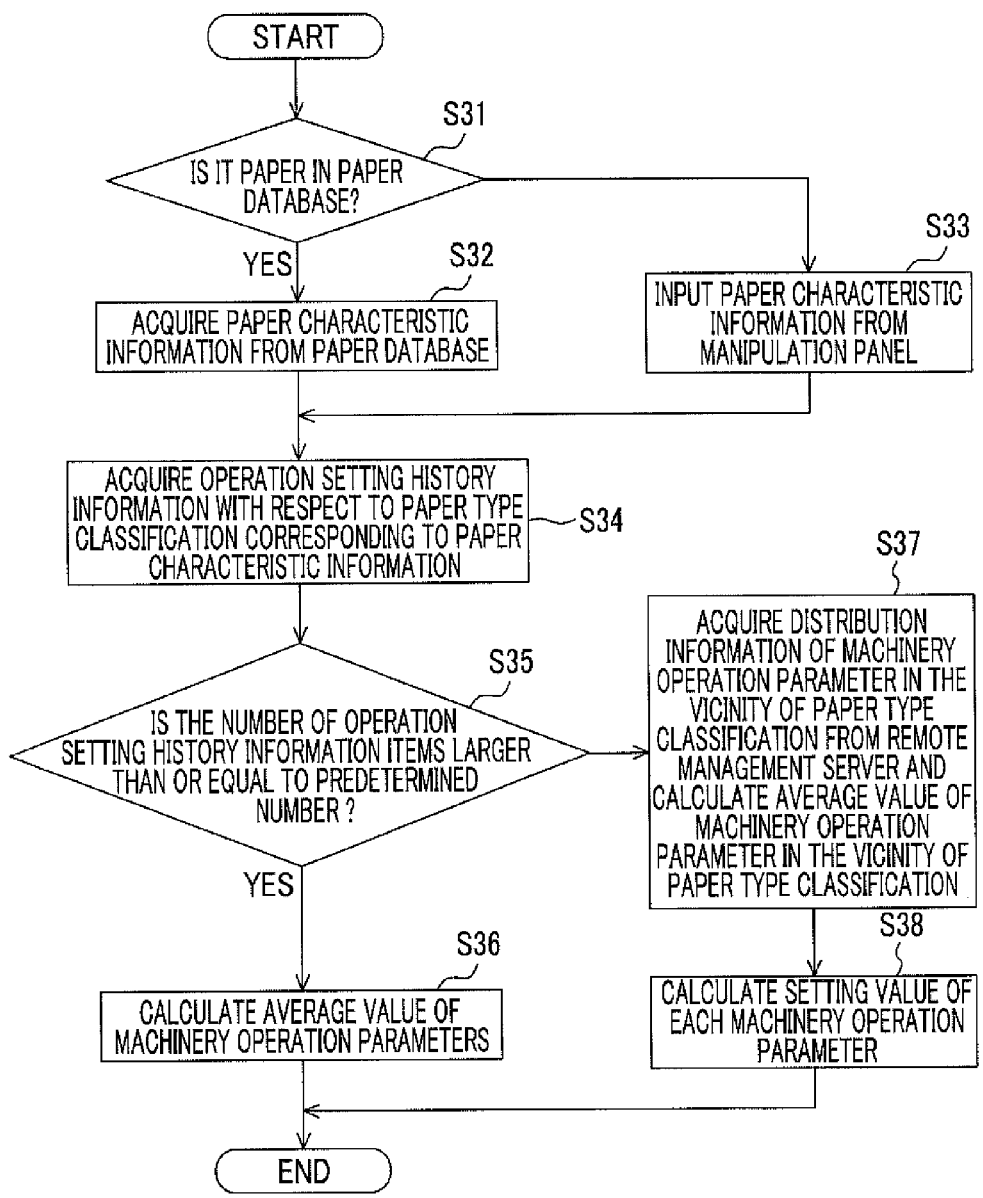
FIG. 5 is a diagram illustrating an example of a processing flow according to setting of each machinery operation parameter at the time of switching the paper type by each image forming apparatus in FIG. 1.

In FIG. 5, an example of a processing flow according to setting of each of the machinery operation parameters at the time of switching the paper type by each of the image forming apparatuses is illustrated.

Each of the image forming apparatuses determines whether or not the paper characteristic information corresponding to the switched paper type is in the paper database by the operation setting correction amount calculating unit 14 (Step S31). When the corresponding paper characteristic information is in the paper database, the paper characteristic information is acquired from the paper database (Step S32), and when the corresponding paper characteristic information is not in the paper database, the paper characteristic information is input from the manipulation panel by the operator (Step S33).

Next, the paper type classification to which the paper characteristic information obtained in Step S31 or S32 belongs is specified, the operation setting history information corresponding to the paper type classification is acquired from the operation setting history information storage unit 13 as the sample (Step S34), and it is determined whether or not the number of samples of the acquired operation setting history information is greater than or equal to a predetermined threshold value (Step S35).

Then, in Step S35, when it is determined that the number of samples of the specified operation setting history information is greater than or equal to the threshold value, the average of the setting values of the machinery operation parameters in the operation setting history information is calculated, and the calculated average value is set as the setting value of the machinery operation parameter after switching the paper type (Step S36).

On the other hand, in Step S35, when it is determined that the number of samples of the specified operation setting history information is smaller than the threshold value, the operation setting history information is acquired from the operation setting history information storage unit 13 and the average of the setting values of each of the machinery operation parameters is calculated with respect to the other plural paper type classifications in which the operation setting history information having a value greater than or equal to the threshold value exists (for example, the paper type classification in the vicinity of the specified paper type classification), and the distribution information of the setting value of each of the machinery operation parameters is acquired from the management server with respect to the specified paper type classification and each of the other plural paper type classifications (Step S37).

Then, based on each information item acquired in Step S37, the setting value of the machinery operation parameter after switching the paper type is calculated (Step S38).

As described above, in the parameter adjusting system of this example, each of the image forming apparatuses accumulates the operation setting history information in which the setting value of each of the machinery operation parameters in the own apparatus is recorded in the operation setting history information storage unit 13, and when the number of samples of the operation setting history information corresponding to the paper type classification after switching the paper type is smaller than the threshold value, with respect to the paper type classification after switching the paper type and each of the other plural paper type classifications having a characteristic close to the paper type classification after switching the paper type, the distribution information of the setting value of each of the machinery operation parameters in the plural image forming apparatuses of the same type with the own apparatus is acquired, and the setting value of the machinery operation parameter after switching the paper type is calculated from the relationship between the obtained distribution information and the operation setting history information of the other plural paper type classifications having the characteristic close to the paper type classification after switching the paper type by the operation setting correction amount calculating unit 14.

Accordingly, in the switching of the paper type to be used in the image forming apparatus, even when the past history of the own apparatus which is used as a reference at the time of calculating the setting value of each of the machinery operation parameters with respect to the switched paper type is insufficient, it is possible to suitably calculate the setting value of the machinery operation parameter.

In addition, in the parameter adjusting system of this example, the management server which collects the operation setting history information in which the setting value of each of the machinery operation parameters from each of the image forming apparatuses is recorded, and calculates the distribution information of the setting value of each of the machinery operation parameters for each type of image forming apparatus and each paper type classification is included, and the operation setting correction amount calculating unit 14 acquires the distribution information of the setting value of each of the machinery operation parameters in the plural image forming apparatuses of the same type with the own apparatus from the management server.

For this reason, it is possible to cause the distribution information used at the time of calculating the setting value of each of the machinery operation parameters to respond to a change in a situation (for example, a seasonal variation) affecting the content of the distribution information, and to maintain the distribution information in a suitable state.

Here, in this example, the paper type classification in the vicinity of the paper type classification after switching the paper type (specifically, each of paper type classification before and after the paper type classification after switching the paper type) is preferentially selected, the distribution information of the setting value of each of the machinery operation parameters is acquired, and the interpolation curve is obtained based on the acquired distribution information, and thus accuracy of the interpolation curve in a relatively narrow range based on the paper type classification after switching the paper type increases.

Accordingly, it is possible to set the setting value of the machinery operation parameter to be close to an ideal value after switching the paper type.

Furthermore, as this example, the interpolation curve may not be obtained based on the information of each one paper type classification before and after the paper type classification after switching the paper type, but the interpolation curve may be obtained based on the information of two paper type classifications before or after the paper type classification after switching the paper type.

In addition, as this example, the interpolation curve may not be obtained based on the information of the two paper type classifications in the vicinity of the paper type classification after switching the paper type, but the interpolation curve may be obtained based on the information of the 3 or more paper type classifications in the vicinity of the paper type classification after switching the paper type.

Next, another configuration example of the parameter adjusting system will be described with reference to FIG. 6.

The parameter adjusting system of this example obtains a correction model (for example, a multiple regression model) of a setting value of each machinery operation parameter according to a change in a usage state (a usage history or a usage environment) of the image forming apparatus for each paper type based on past history of the setting value of each of the machinery operation parameters in the plural image forming apparatuses, and corrects the setting value of each of the machinery operation parameters according to the change in the usage state of the image forming apparatus by using the correction model.

Figure 6:
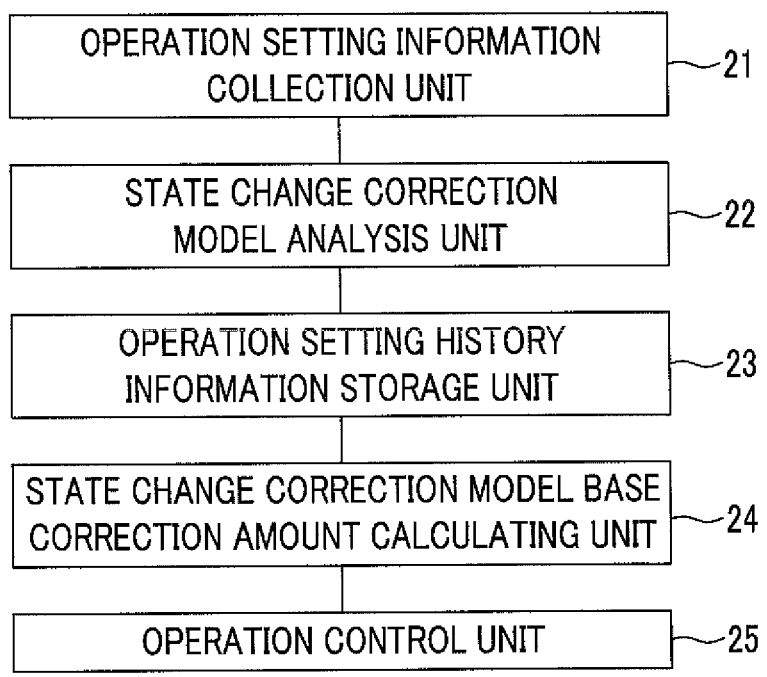
FIG. 6 is a diagram illustrating another configuration example of the parameter adjusting system according to the exemplary embodiment of the invention.

As illustrated in FIG. 6, the parameter adjusting system of this example includes an operation setting information collection unit 21, a state change correction model analysis unit 22, an operation setting history information storage unit 23, a state change correction model base correction amount calculating unit 24, and an operation control unit 25.

The parameter adjusting system operates, for example, in cooperation with a so-called remote management system including a management server which is connected to a network to be communicable with the plural image forming apparatuses. In this example, the management server includes the operation setting information collection unit 21, and the state change correction model analysis unit 22, and each of the image forming apparatuses includes the operation setting history information storage unit 23, the state change correction model base correction amount calculating unit 24, and the operation control unit 25, but the configuration is not limited thereto.

Similar to the operation setting information collection unit 11 of FIG. 1, the operation setting information collection unit 21 collects operation setting history information in which the setting value of each changed machinery operation parameter is recorded at the timing that the setting value of the machinery operation parameter required to be adjusted for each paper type is changed according to the switching of the paper type from the plural image forming apparatuses connected to the management server through the network, and accumulates the operation setting history information and paper type information for identifying the switched paper type for each type of image forming apparatus and each paper type classification.

That is, in the plural image forming apparatuses, the setting value of each of the machinery operation parameters which is manually or automatically changed with respect to the switched paper type is accumulated as the past history.

In addition, for each predetermined timing the operation setting information collection unit 21 collects the operation setting adjustment information in which the setting value of each of the machinery operation parameters at each predetermined timing is recorded and usage state history information indicating the usage state of the image forming apparatus at each predetermined timing from the plural image forming apparatuses connected to the management server through the network, and accumulates the operation setting adjustment information, the usage state history information, and the paper type information for identifying the paper type used at that timing for each type of image forming apparatus and each of the paper type classifications.

That is, an adjustment result of the setting value of each of the machinery operation parameters according to the change of the usage state for each of the image forming apparatuses is accumulated as the past history.

In this example, as the usage state history information, the number of output sheets (a type of usage history) for each of the paper type classifications is collected, but another type of value which is able to grasp the usage state of the image forming apparatus such as an operating time or a conducting timing of the apparatus may be collected.

As the timing for collecting operation setting adjustment information and the usage state history information, for example, a timing of each occasion in which the usage state of the image forming apparatus is changed to a certain degree (for example, every 100 print output sheets) is used.

Similar to the operation setting information analysis unit 12 of FIG. 1, the state change correction model analysis unit 22 analyzes the operation history setting information (the setting value of each of the machinery operation parameters) which is collected and accumulated by the operation setting information collection unit 21, calculates distribution information indicating a trend of setting values with respect to each of the machinery operation parameters, and stores the calculation result for each type of image forming apparatus and each of the paper type classifications.

In addition, the state change correction model analysis unit 22 analyzes the operation setting adjustment information and the usage state history information which are collected and accumulated by the operation setting information collection unit 21, calculates a state change correction model in which the transition of the setting value is modeled according to the change (in this example, an increase of the number of output sheets) of the usage state of the image forming apparatus with respect to each of the machinery operation parameters, and stores the calculation result for each type of image forming apparatus and each of the paper type classifications.

In this example, the state change correction model is calculated by a multiple regression analysis, but the method is not limited thereto, and the modeling may be performed by other methods.

The analysis of the operation setting adjustment information and the usage state history information is implemented at a predetermined timing, for example, is implemented at the same timing every day.

In the parameter adjusting system of this example, the above processes (processes according to the operation setting information collection unit 21, and the state change correction model analysis unit 22) are implemented on the management server side, and the following processes (processes according to the operation setting history information storage unit 23, the state change correction model base correction amount calculating unit 24, and the operation control unit 25) are implemented by each of the image forming apparatuses.

Similar to the operation setting history information storage unit 13 of FIG. 1, the operation setting history information storage unit 23 collects the operation setting history information in which the setting value of each of the machinery operation parameters of the own apparatus is recorded at the timing that the setting value of the machinery operation parameter required to be adjusted for each paper type is changed according to the switching of the paper type, and accumulates the operation setting history information for each of the paper type classifications identical to that of the management server side.

That is, in the own apparatus, the setting value of each of the machinery operation parameters which is manually or automatically changed with respect to the switched paper type is accumulated as the past history.

In addition, for each predetermined timing the operation setting history information storage unit 23 collects the operation setting adjustment information in which the setting value of each of the machinery operation parameters at each timing is recorded and the usage state history information indicating the usage state of the image forming apparatus at each timing that the usage state of the own apparatus is changed to a certain degree, and accumulates the operation setting adjustment information and the usage state history information for each of the paper type classifications identical to that of the management server side.

That is, an adjustment result of the setting value of each of the machinery operation parameters according to the change of the usage state in the own apparatus is accumulated as the past history.

Similar to the operation setting correction amount calculating unit 14 of FIG. 1, the state change correction model base correction amount calculating unit 24 calculates the setting value of each of the machinery operation parameters after switching the paper type at the timing of switching the paper type to be used.

In addition, the state change correction model base correction amount calculating unit 24 requests the state change correction model of each of the machinery operation parameters to the state change correction model analysis unit 22 of the management server based on the plural image forming apparatuses of the same type with the own apparatus with respect to the paper type classification after switching the paper type, and receives the corresponding state change correction model.

Then, based on the state change correction model of each of the machinery operation parameters received from the state change correction model analysis unit 22, and the calculation result of the setting value of each of the machinery operation parameters after switching the paper type, a correction amount of the setting value of each of the machinery operation parameters according to the change of the subsequent usage state is sequentially calculated.

The correction amount of the setting value of the machinery operation parameter A is calculated at a predetermined timing, for example, at the timing of each occasion in which the usage state of the image forming apparatus is changed to a certain degree (for example, every 100 print output sheets) or at the same timing every day.

The calculation of the correction amount of the setting value of each of the machinery operation parameters according to the change in the usage state of the image forming apparatus will be specifically described with reference to FIGS. 7A to 7E.

Here, for the sake of simplicity of the description, the paper type classification in which the basis weight which is a type of paper characteristic is divided into three steps according to magnitude of the value is used, and a basis weight classification 1, a basis weight classification 2, and a basis weight classification 3 are set in increasing order of the value of the basis weight. In addition, the switched paper type belongs to the basis weight classification 2.

In FIGS. 7A to 7C, with respect to each of the basis weight classifications 1 to 3, graphs of the setting values of machinery operation parameters A which are changed according to the usage state of the image forming apparatus at the time of using a paper type belonging to the paper type classification are illustrated. In the graphs, a horizontal axis indicates a usage history (for example, the number of output sheets) which is a type of usage state, and a vertical axis indicates the setting value at the time corresponding to the usage history.

As illustrated in each of the graphs of FIGS. 7A to 7C, a trend in which the setting values of the machinery operation parameters A gradually increase as the usage state of the image forming apparatus is changed (for example, the number of output sheets increases) appears in all of the basis weight classifications 1 to 3.

Figure 7D:
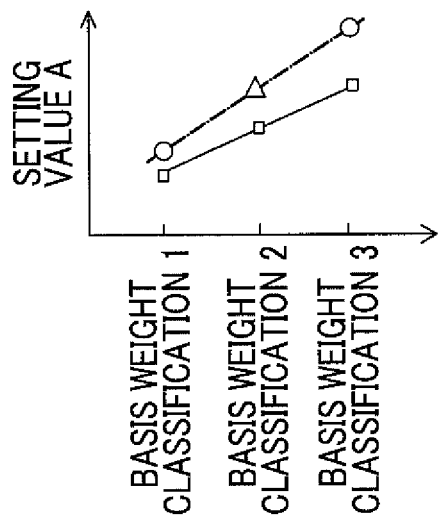

When the switched paper type belongs to the basis weight classification 2, the state change correction model base correction amount calculating unit 24, first, calculates the setting value of the machinery operation parameter A after switching the paper type by a method identical to the method described with reference to FIGS. 2A to 2E, as illustrated in FIG. 7D.

Figure 7E:
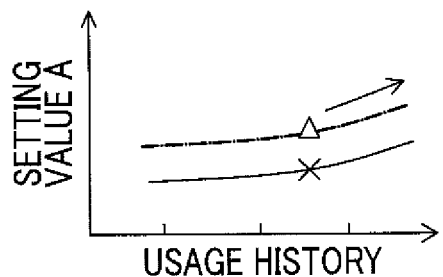

Then, as illustrated in FIG. 7E, the state change correction model is adapted to the own apparatus based on a difference between the setting value (indicated by a mark "x") of the machinery operation parameter A obtained by referring the state change correction model for the basis weight classification 2 illustrated in FIG. 7B to the usage state of the image forming apparatus of the current time, and the setting value (indicated by a mark "Δ") of the calculated machinery operation parameter A. In FIG. 7E, the state change correction model adapted to the own apparatus is illustrated by a dashed and dotted line.

Then, the state change correction model base correction amount calculating unit 24 sequentially calculates the correction amount of the setting value of the machinery operation parameter A in accordance with the change of the subsequent usage state (in this example, the increase in the number of output sheets) according to the state change correction model adapted to the own apparatus. As the transition of the setting value of the machinery operation parameter A according to the change of the usage state, the same trend (the same state change correction model) is used in the same type of plural image forming apparatuses.

Thus, the state change correction model calculated with respect to the plural image forming apparatuses of the same type with the own apparatus is converted according to the calculation result of the setting value of each of the machinery operation parameters after switching the paper type in the own apparatus, and the state change correction model obtained therefor which is adapted to the own apparatus is used, and thus it is possible to sequentially calculate the correction amount of the setting value of each of the machinery operation parameters according to the change in the usage state of the own apparatus.

Furthermore, in the above description, a case where the paper type is switched to the paper type belonging to the basis weight classification 2 in which the number of samples of the operation setting history information is insufficient is described as an example, but the calculation of the correction amount of the setting value of each of the machinery operation parameters based on the state change correction model may be applied to a case where the paper type is switched to the paper type belonging to the basis weight classifications 1 and 3 in which the number of samples of the operation setting history information is sufficient.

The operation control unit 25 controls the subsequent (after switching the paper type) image forming process by applying the setting value of each of the machinery operation parameters calculated by the state change correction model base correction amount calculating unit 24, and by applying the correction value of the setting value of each of the machinery operation parameters.

Furthermore, a function unit in which the setting value or the correction value of each of the machinery operation parameters calculated by the state change correction model base correction amount calculating unit 24 is displayed as a recommendation value may be disposed instead of the operation control unit 25, and the operator of the image forming apparatus may manually perform setting or adjusting of each of the machinery operation parameters according to the displayed setting value or correction value.

A flow of a process according to the parameter adjusting system of this example will be described with reference to an example of a processing flow illustrated in FIG. 8 to FIG. 10.

Figure 8:
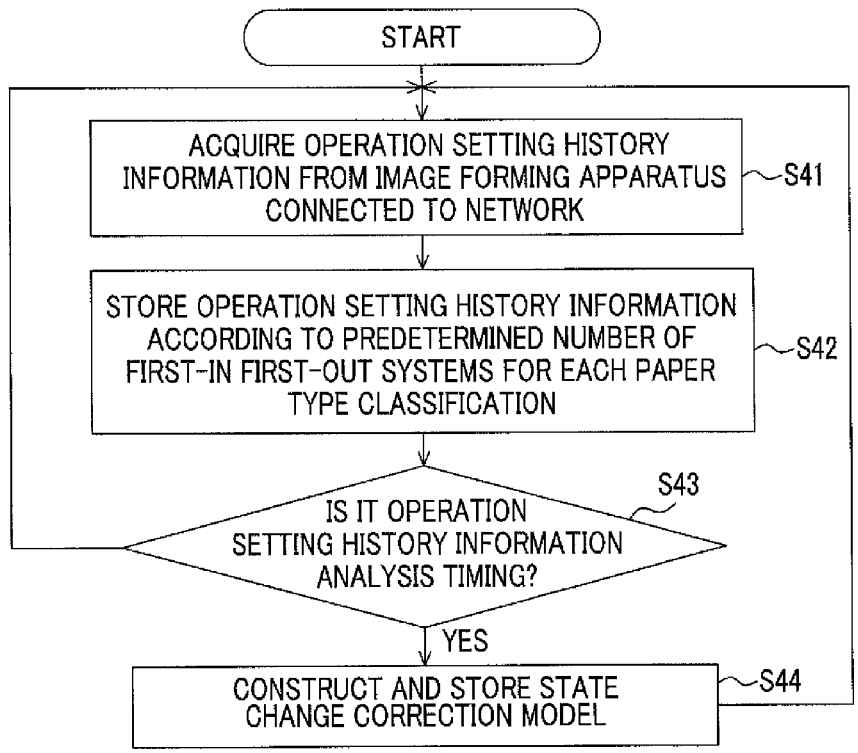
FIG. 8 is a diagram illustrating an example of a processing flow according to a collection and an analysis of operation setting history information by a management server in FIG. 6.

In FIG. 8, an example of a processing flow according to a collection and an analysis of the operation setting information (the setting value of each of the machinery operation parameters) by a management server is illustrated.

The management server collects the operation setting history information from the plural image forming apparatuses connected to the network by the operation setting information collection unit 21 (Step S41), and stores the operation setting history information according to a first-in first-out system of the predetermined number of data items for each type of image forming apparatus and each paper type classification (Step S42).

In addition, the management server determines whether or not it is an analysis timing of the operation setting history information (Step S43), and when the management server determines that it is not the analysis timing, the process returns to Step S41, and the collection and the storage of the operation setting information from each of the image forming apparatuses are repeated until the management server determines that it is the analysis timing.

In Step S43, when the management server determines that it is the analysis timing, the state change correction model analysis unit 22 performs a statistical analysis with respect to the operation setting information and the usage state history information collected by the operation setting information collection unit 21, and calculates the state change correction model based on the analysis result to be stored (Step S44).

Figure 9:
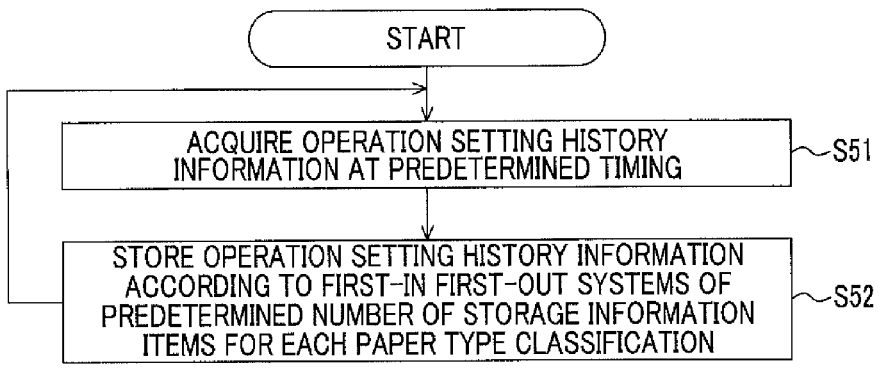
FIG. 9 is a diagram illustrating an example of a processing flow according to the collection of the operation setting history information by each image forming apparatus in FIG. 6.

In FIG. 9, an example of a processing flow according to the collection of the operation setting history information (the setting value of each of the machinery operation parameters) by each of the image forming apparatuses is illustrated.

Each of the image forming apparatuses collects the operation setting history information and the usage state history information by the operation setting history information storage unit 23 (Step S51), and stores the operation setting history information and the usage state history information according to the first-in first-out system of the predetermined number of data items for each paper type classification (Step S52).

The collection or the storage of the operation setting history information and the usage state history information by the operation setting history information storage unit 23 is repeated each timing that the usage state of the image forming apparatus is changed to a certain degree.

Figure 10:
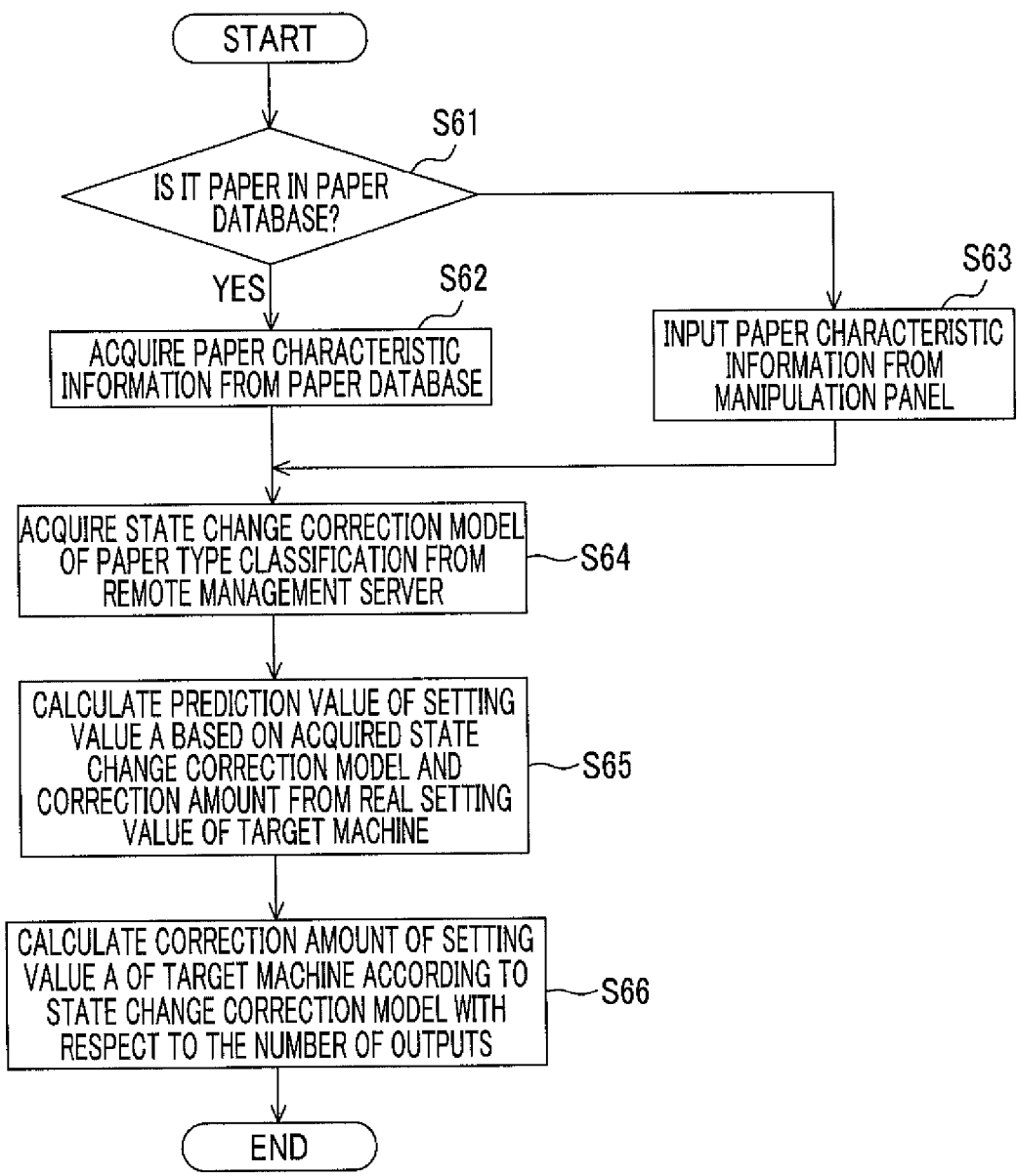
FIG. 10 is a diagram illustrating an example of a processing flow according to setting of each machinery operation parameter at the time of switching a paper type by each image forming apparatus in FIG. 6.

In FIG. 10, an example of a processing flow according to the setting of each of the machinery operation parameters at the time of switching the paper type by each of the image forming apparatuses is illustrated.

Each of the image forming apparatuses determines whether or not the paper characteristic information corresponding to the switched paper type is in the paper database by the state change correction model base correction amount calculating unit 24 (Step S61). When the corresponding paper characteristic information is in the paper database, the paper characteristic information is acquired from the paper database (Step S62), and when the corresponding paper characteristic information is not in the paper database, the paper characteristic information is input from the manipulation panel by the operator (Step S63).

Next, the paper type classification to which the paper characteristic information obtained in Step S61 or S62 belongs is specified, the setting value of the machinery operation parameter after switching the paper type is calculated with respect to the paper type classification, and the state change correction model with respect to the paper type classification is acquired from the management server (Step S64).

Then, the state change correction model is corrected to be adapted to the own apparatus based on the setting value of the machinery operation parameter obtained by referring the usage state of the image forming apparatus of the current time to the state change correction model, and the setting value of the calculated machinery operation parameter (Step S65), and the correction amount of the setting value of the machinery operation parameter according to the change of the subsequent usage state is calculated in accordance with the corrected state change correction model (Step S66).

As described above, in the parameter adjusting system of this example, each of the image forming apparatuses calculates the setting value of the machinery operation parameter after switching the paper type by the state change correction model base correction amount calculating unit 24, and acquires the state change correction model in which a time-oriented correction result of the machinery operation parameter in the plural image forming apparatuses of the same type with the own apparatus is modeled from the state change correction model analysis unit 22 of the management server, and calculates the correction amount of the setting value of the machinery operation parameter according to the change of the subsequent usage state based on the acquired state change correction model.

Accordingly, an adjustment (a correction) of the setting value of the machinery operation parameter according to the change of the usage state of the image forming apparatus is able to be easily and suitably performed, and thus it is possible to reduce a work load with respect to the adjustment of the setting value of the machinery operation parameter.

Here, the image forming apparatus of this example is realized by a computer including a main memory device such as a Central Processing Unit (CPU) for performing various computing processes, a Random Access Memory (RAM) which is a working region of the CPU, or a Read Only Memory (ROM) in which a basic control program and the like is recorded, an auxiliary memory device such as Hard Disk Drive (HDD) for memorizing various programs or data items, a display device for displaying various information items, and hardware resources such as a manipulation button used during an input manipulation by a manipulator, an input and output I/F which is an interface with an input instrument such as a touch panel, or a communication I/F which is an interface for performing wired or wireless communication with respect to other apparatuses.

Then, a program according to an exemplary embodiment of the invention is readout from the auxiliary memory apparatus or the like and installed in the RAM, and then executed by the CPU. Therefore, each function of the parameter adjust apparatus according to the exemplary embodiment of the invention is realized by the computer of the image forming apparatus.

Furthermore, in the example of FIG. 1, a function of a storage unit according to the exemplary embodiment of the invention is realized by the operation setting history information storage unit 13, and functions of an acquiring unit and a calculating unit according to the exemplary embodiment of the invention are realized by the operation setting correction amount calculating unit 14.

In addition, in the example of FIG. 6, a function of a collection unit according to an exemplary embodiment of the invention is realized by the operation setting history information storage unit 23, and functions of an acquiring unit, a calculating unit, and a correction unit according to the exemplary embodiment of the invention are realized by the state change correction model base correction amount calculating unit 24.

Here, the program according to the exemplary embodiment of the invention is set, for example, in the computer of the image forming apparatus according to a method for reading out the program from an external memory medium such as a CD-ROM in which the program is memorized, a method for receiving the program through a communication network or the like, or the like.

Furthermore, the exemplary embodiment of the invention is not limited to an aspect in which each function unit is realized by a software configuration as in this example, but each of the function units may be realized by a dedicated hardware module.

In addition, in each parameter adjusting system described above, each of the image forming apparatuses calculates the setting value of the machinery operation parameter in the own apparatus or the correction amount thereof, but the management server may include a function unit for calculating the setting value of the machinery operation parameter in each of the image forming apparatuses or the correction amount thereof, and may provide (transmit) a calculation result by the function unit to the corresponding image forming apparatus.

The exemplary embodiment of the invention is able to be used in various systems or apparatuses, and programs or methods thereof, or the like which set the parameter value for controlling the image forming operation in the image forming apparatus according to the paper type.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A parameter setting system, comprising:
   a memory device configured to store a history of parameter values in an image forming apparatus in association with a type of paper with respect to the image forming apparatus which sets the parameter value for controlling an image forming operation according to the type of paper; and
   a processor configured to act as:
   an acquiring unit configured to acquire, via a network, a trend of parameter values in a plurality of image forming apparatuses of the same type with the image forming apparatus with respect to each type of a plurality of other paper sheets in which the number of types of switched paper and the number of histories are greater than or equal to a threshold value when the number of histories corresponding to the type of switched paper upon switching the type of paper to be used in the image forming apparatus is smaller than the threshold value;
   a calculating unit configured to calculate, a parameter value to be set for the image forming apparatus with respect to the type of switched paper based on the trend of parameter values acquired with respect to the type of switched paper and each type of the plurality of other paper sheets, and the history corresponding to each type of the plurality of other paper sheets; and
   an operational control unit configured to set the calculated parameter value in the image forming apparatus for use in an image forming process, and to control the image forming process using the set calculated parameter value,
   wherein the trend is derived based upon distribution information of the parameter values.

2. The parameter setting system according to claim 1, wherein each type of the plurality of other paper sheets has a characteristic close in a value to a characteristic of the type of switched paper.

3. The parameter setting system according to claim 2, further comprising:
   a management server that collects the history of the parameter value from the plurality of image forming apparatuses, and calculates the trend of parameter values for each type of image forming apparatuses,
   wherein the acquiring unit acquires the trend of parameter values of the plurality of image forming apparatuses of the same type with the image forming apparatus that switches the paper to be used from the management server.

4. The parameter setting system according to claim 3, further comprising:
   the processor further configured to act as a correction unit that calculates a correction amount of a parameter value according to a change of a usage state of the image forming apparatus,
   wherein the correction unit calculates a correction amount of a parameter value corresponding to the usage state of the image forming apparatus based on a prediction model in which a time-series correction result of the parameter value in the plurality of image forming apparatuses of the same type with the image forming apparatus is modeled.

5. The parameter setting system according to claim 2, further comprising:
   the processor further configured to act as a correction unit that calculates a correction amount of a parameter value according to a change of a usage state of the image forming apparatus,
   wherein the correction unit calculates a correction amount of a parameter value corresponding to the usage state of the image forming apparatus based on a prediction model in which a time-series correction result of the parameter value in the plurality of image forming apparatuses of the same type with the image forming apparatus is modeled.

6. The parameter setting system according to claim 1, further comprising:
   a management server that collects the history of the parameter value from the plurality of image forming apparatuses, and calculates the trend of parameter values for each type of image forming apparatuses,
   wherein the acquiring unit acquires the trend of parameter values of the plurality of image forming apparatuses of the same type with the image forming apparatus that switches the paper to be used from the management server.

7. The parameter setting system according to claim 6, further comprising:
   the processor further configured to act as a correction unit that calculates a correction amount of a parameter value according to a change of a usage state of the image forming apparatus,
   wherein the correction unit calculates a correction amount of a parameter value corresponding to the usage state of the image forming apparatus based on a prediction model in which a time-series correction result of the parameter value in the plurality of image forming apparatuses of the same type with the image forming apparatus is modeled.

8. The parameter setting system according to claim 1, further comprising:
   the processor further configured to act as a correction unit that calculates a correction amount of a parameter value according to a change of a usage state of the image forming apparatus,
   wherein the correction unit calculates a correction amount of a parameter value corresponding to the usage state of the image forming apparatus based on a prediction model in which a time-series correction result of the parameter value in the plurality of image forming apparatuses of the same type with the image forming apparatus is modeled.

9. A parameter setting apparatus comprising the parameter setting system according to claim 1.

10. The parameter setting system according to claim 1, further comprising:
    the processor further configured to act as an analysis unit that analyzes the parameter values and calculates distribution information indicating the trend of the parameter values, and
    wherein the acquiring unit acquires the distribution information indicating the trend of parameter values.

11. The parameter setting system according to claim 10, wherein
    the processor further configured to act as the analysis unit calculates the distribution information based upon a histogram of the parameter values.

12. The parameter setting system according to claim 10, wherein the distribution information includes statistics such as a central value or a standard deviation of the parameter values.

\* \* \* \* \*